(12) United States Patent
Lopez et al.

(10) Patent No.: US 10,439,539 B2
(45) Date of Patent: Oct. 8, 2019

(54) FEEDBACK CONTROL SYSTEM AND METHOD

(71) Applicant: ANALOG DEVICES GLOBAL UNLIMITED COMPANY, Hamilton (BM)

(72) Inventors: Jesus Javier Lopez, Mutxamel (ES); Alberto Marinas, El Puig (ES); Eduardo M. Martinez, Valencia (ES); Santiago Iriarte, Puzol (ES)

(73) Assignee: ANALOG DEVICES GLOBAL UNLIMITED COMPANY, Hamilton (BM)

( * ) Notice: Subject to any disclaimer, the term of this patent is extended or adjusted under 35 U.S.C. 154(b) by 0 days.

(21) Appl. No.: 15/135,330

(22) Filed: Apr. 21, 2016

(65) Prior Publication Data
US 2016/0344327 A1    Nov. 24, 2016

Related U.S. Application Data

(60) Provisional application No. 62/164,873, filed on May 21, 2015.

(51) Int. Cl.
*H02P 25/034* (2016.01)
(52) U.S. Cl.
CPC .................................. *H02P 25/034* (2016.02)
(58) Field of Classification Search
USPC ........................................................ 318/135
See application file for complete search history.

(56) References Cited

U.S. PATENT DOCUMENTS

| | | | | |
|---|---|---|---|---|
| 5,838,515 A * | 11/1998 | Mortazavi | .............. | G11B 5/022 360/75 |
| 2002/0071199 A1* | 6/2002 | Kokami | .............. | G11B 5/5547 360/77.02 |
| 2007/0290667 A1* | 12/2007 | Nagai | .................. | H02M 3/157 323/284 |
| 2010/0053802 A1* | 3/2010 | Yamashita | ........... | G11B 5/5547 360/78.04 |
| 2012/0319499 A1* | 12/2012 | Ooishi | .................. | H02M 3/156 307/104 |

(Continued)

OTHER PUBLICATIONS

Sung-Hyun Yang et al., *On-Chip Voice-Coil Motor Driver for Mobile Auto-Focus Camera Applications*, 2005 IEEE Asian Solid-State Circuits Conference, Nov. 1-3, 2005, pp. 101-104.

(Continued)

*Primary Examiner* — Jorge L Carrasquillo
(74) *Attorney, Agent, or Firm* — Patent Capital Group

(57) ABSTRACT

The present disclosure provides a feedback control system and method for a bidirectional VCM. The system employs an analog core that is common to both the PWM and linear modes of operation. The analog core includes a feedback mechanism that determines the error in the current flowing through the motor. The feedback mechanism produces an error voltage that corresponds to the current error, and applies the voltage to a control driver. The control driver then controls the motor, based on the error voltage, in either a PWM or linear mode. By sharing a common core, the switching time between modes is improved. Furthermore, the output current error between modes is reduced.

17 Claims, 10 Drawing Sheets

(56) References Cited

U.S. PATENT DOCUMENTS

| | | | | |
|---|---|---|---|---|
| 2013/0163123 A1* | 6/2013 | Otaguro | ............... | G11B 5/022 |
| | | | | 360/264.7 |
| 2013/0207625 A1* | 8/2013 | Futamura | ............... | G05F 1/10 |
| | | | | 323/271 |
| 2014/0203751 A1* | 7/2014 | Kurosawa | ............ | H02P 25/034 |
| | | | | 318/565 |
| 2016/0087526 A1* | 3/2016 | Satake | .................. | H02M 1/36 |
| | | | | 323/282 |

OTHER PUBLICATIONS

Jhih-Da Hsu et al., *Design and Implementation of a Voice-Coil Motor Servo Control IC for Auto-Focus Mobile Camera Applications*, 2007 IEEE Power Electronics Specialists Conference, Jun. 17-21, 2007, pp. 1357-1362.

\* cited by examiner

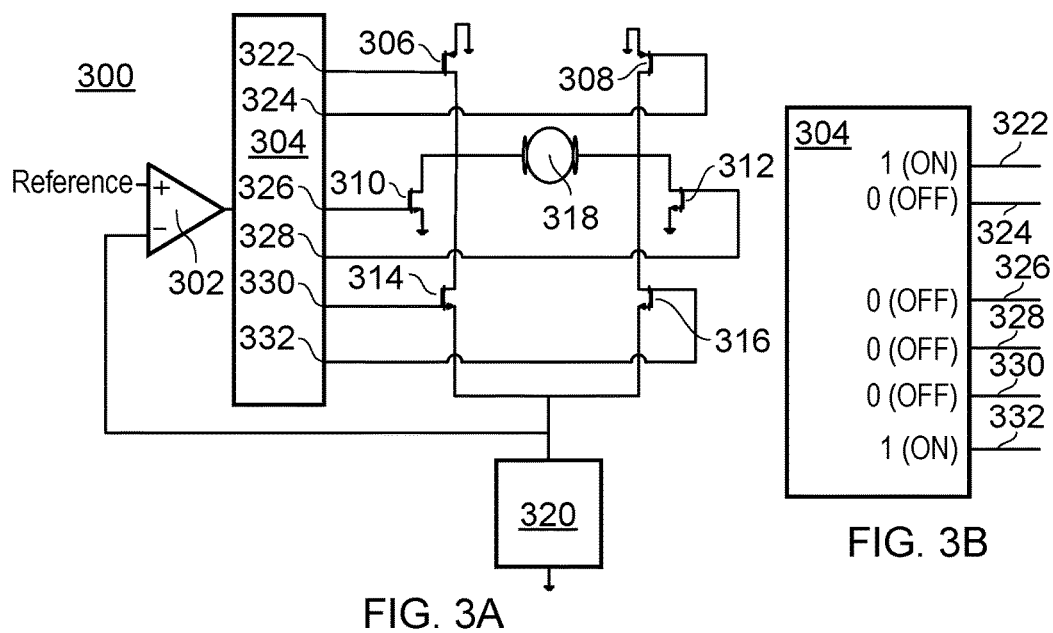
FIG. 3A
FIG. 3B
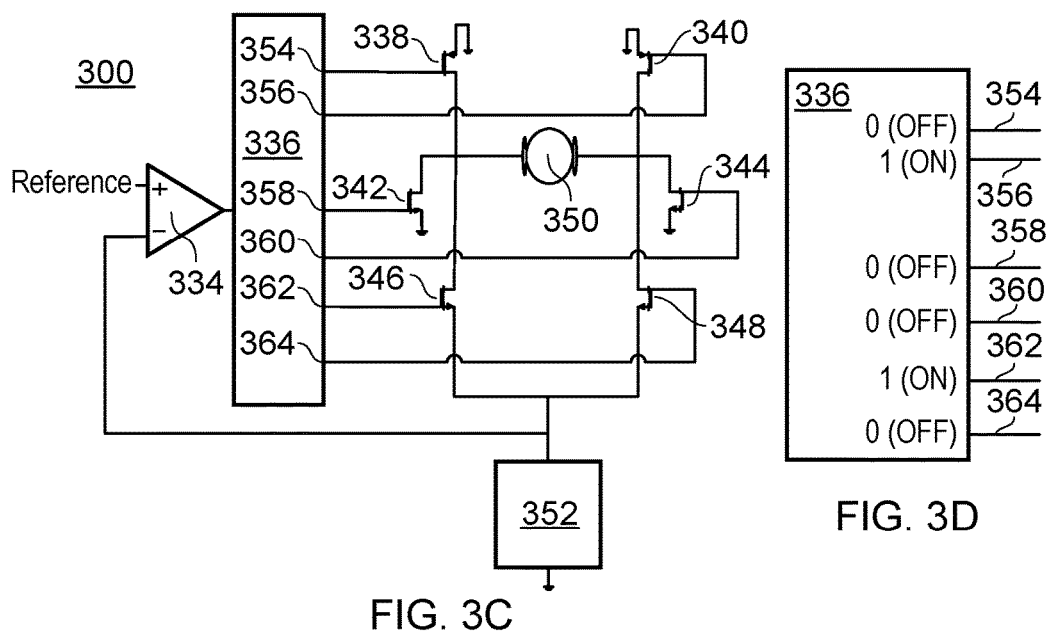
FIG. 3C
FIG. 3D

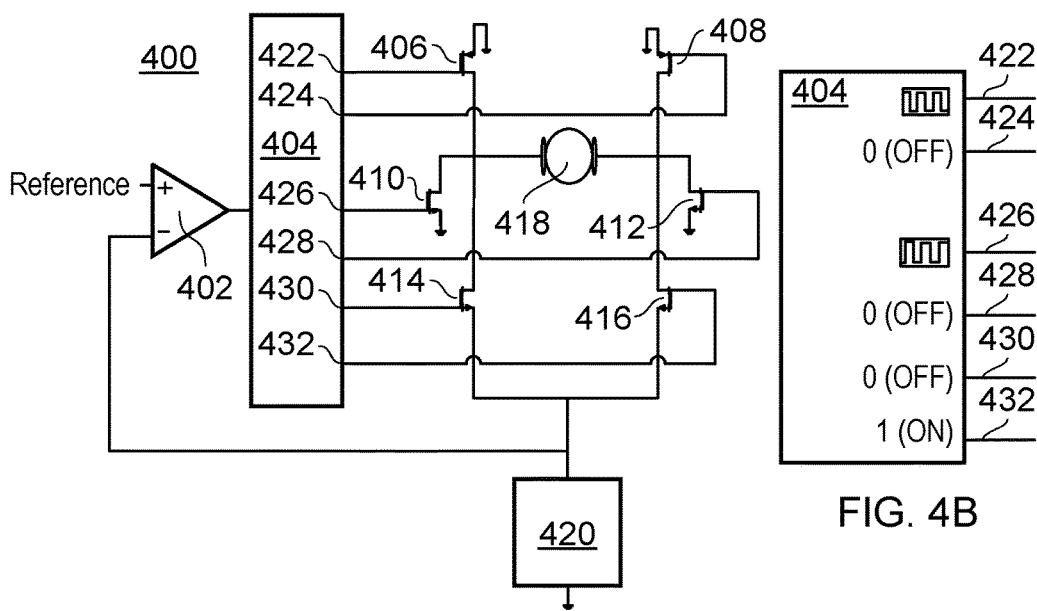
FIG. 4A
FIG. 4B
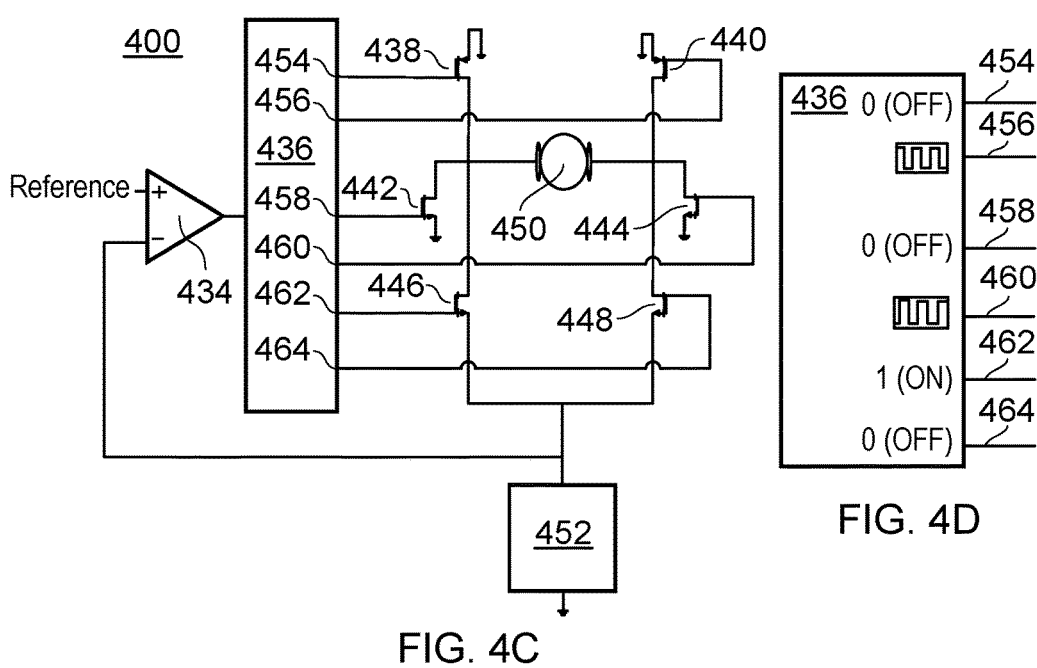
FIG. 4C
FIG. 4D

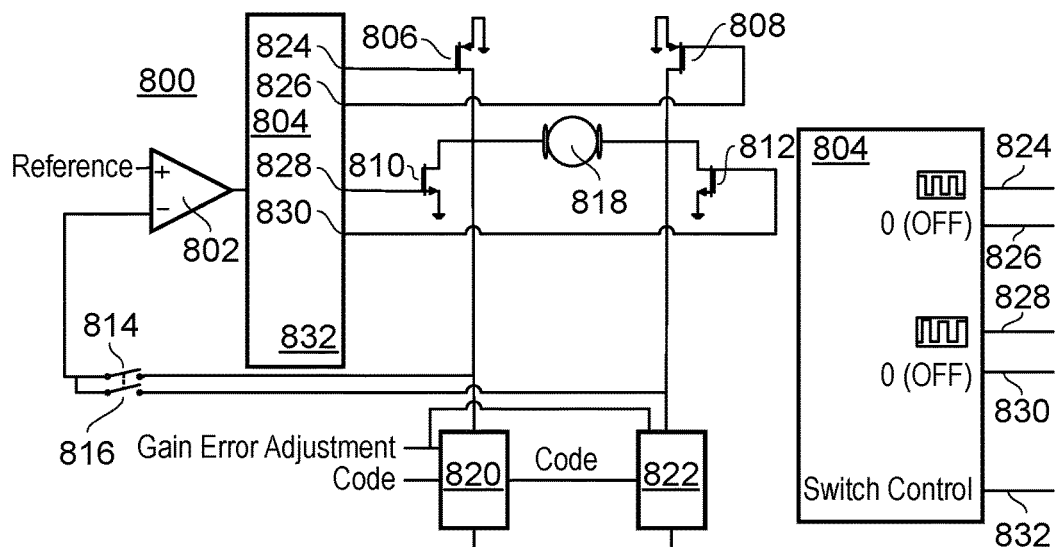
FIG. 8A
FIG. 8B
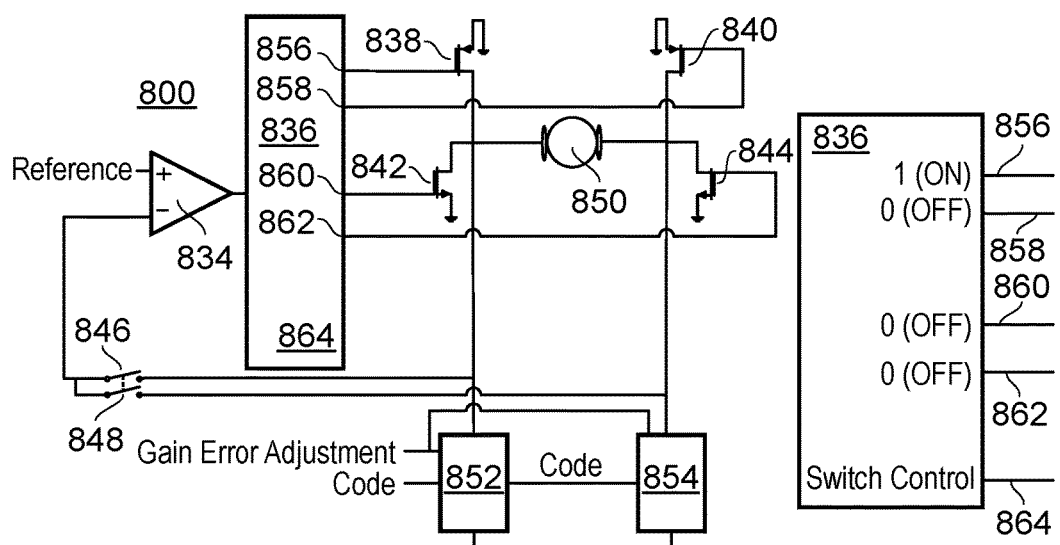
FIG. 8C
FIG. 8D

FEEDBACK CONTROL SYSTEM AND METHOD

PRIORITY DATA

This application is a non-provisional of U.S. Provisional Patent Application Ser. No. 62/164,873, filed May 21, 2015, which is hereby incorporated by reference in its entirety.

TECHNICAL FIELD

The present disclosure relates to a feedback control system and method. In particular, the present disclosure relates to a feedback control system and method for use with a voice coil motor.

BACKGROUND

Voice coil motors (VCMs) are actuators used to drive electromagnetic loads. Applications typically use VCMs due to their small size, low cost, and shock resistance. Moreover, VCM applications frequently require both forward and reverse VCM operations. For example, VCMs are used to move the read/write head in hard disk drive applications and are used to focus lenses in imaging applications.

Generally, VCMs include at least a permanent magnetic circuit and a coil. In a closed loop feedback system, a VCM interacts with a bridge circuit that drives a current through an electromagnetic load of the VCM.

To drive the current, a first set of analog circuitry that provides a dynamic, or linear, driving operation is often used in conjunction with the VCM. Dynamic drivers provide reliably linear drive signals to the electromagnetic load. However, dynamic drivers are inefficient as they dissipate a relatively large amount of power. Designers generally use dynamic drivers only in circumstances in which it is important to minimize noise and in which electromagnetic compatibility (EMC) is critical.

As an alternative to drive the current, a second set of circuitry that provides a pulse width modulation (PWM) driving operation is used in conjunction with the VCM. PWM drivers are more efficient and dissipate relatively less power than dynamic drivers. However, PWM drivers generate a great deal of radiative and conductive noise that can interfere with sensitive circuit operations proximate or connected to the VCM.

Previous VCM driving schemes generally provide systems that use only the dynamic driving operation or the PWM driving operation. In some circumstances in which both the dynamic and the PWM driving operations are used with respect to the same motor, it is often the case that the motor cannot also be operated in both a forward direction and a reverse direction for each of the dynamic and the PWM driving operations.

In some other circumstances in which both the dynamic and the PWM driving operations are performed with respect to the same motor, each driving operation is associated with a different set of core analog components in the feedback loop. Switching between the different sets of core analog components requires a transition period of time between the implementation of the different modes. Additionally, switching between the different sets of core analog components introduces an output current error between modes.

Accordingly, there exists a need for an improved voice coil motor driver that is capable of driving a load using both a PWM mode and a linear mode.

SUMMARY

The present disclosure provides a feedback control system and method for a VCM. The system utilises an analog core that is common to both the PWM and linear modes of operation. The analog core includes a feedback mechanism that determines the error in the current flowing through the motor. The feedback mechanism produces an error voltage that corresponds to the current error, and applies the voltage to a control driver. The control driver then controls the motor, based on the error voltage, in either a PWM or linear mode. By sharing a common core, the switching time between modes is improved. Furthermore, the output current error between modes is reduced.

In a first aspect, the present disclosure provides a feedback control system, comprising: an analog core; a control driver; and an electromagnetic load of a voice coil motor (VCM); wherein the analog core is arranged provide feedback from the electromagnetic load to the control driver in order to regulate the current consumption of the VCM; the control driver is arranged to receive, from the analog core, an error voltage corresponding to an error in the current being driven onto the electromagnetic load; and the control driver is further arranged to control the current driven onto the electromagnetic load based on the error voltage.

The feedback control system may operate in a closed loop. The control driver may interchangeably operate in a linear mode (sometimes called a dynamic mode) and a pulse width modulation (PWM) mode. The control driver, in each of the linear mode and the PWM mode, may further interchangeably operate the motor in a forward direction and a reverse direction. During operation in each of the linear mode and the PWM mode, the analog core may be used to bi-directionally drive the motor. The interchangeability of the analog core results in low DC voltage error between the operation of the motor in the linear mode and the PWM mode.

The analog core of the feedback control system may include at least: a collection of NMOS switches (n-type MOSFETs) and PMOS switches (p-type MOSFETs) and an operational amplifier. In some embodiments, the analog core may further include at least one of: a resistive digital-to-analog converter (r-DAC), voltage switches, and a resistor. The collection of NMOS switches and PMOS switches within the analog core may be generally in the formation of an H-bridge circuit.

In a second aspect, the present disclosure provides a controller for a voice coil motor (VCM) in which the controller is arranged to operate the voice coil motor bidirectionally in linear and pulse width modulation modes.

In a third aspect, the present disclosure provides a method of controlling the current applied to an electromagnetic load of a voice coil motor (VCM), comprising: driving an electromagnetic load of a voice coil motor (VCM); receiving from an analog core, at a control driver, an error voltage corresponding to an error in the current being driven onto the electromagnetic load; controlling, using the control driver, the current driven onto the electromagnetic load based on the error voltage.

BRIEF DESCRIPTION OF THE DRAWINGS

The present disclosure will now be described, by way of example only, with reference to the accompanying drawings, in which:

FIGS. 3A to 3D show a feedback control system and a control driver being operated in a linear mode, in accordance with an embodiment of the disclosure;

FIGS. 4A to 4D show a feedback control system and a control driver being operated in a pulse width modulation mode, in accordance with an embodiment of the disclosure;

FIGS. 8A to 8D show a feedback control system and a control driver being operated in a pulse width modulation and a linear mode, in accordance with an embodiment of the disclosure;

DETAILED DESCRIPTION OF EMBODIMENTS

The present disclosure provides a feedback control system for a bidirectional VCM. The feedback control system includes an analog core and a control driver. The analog core determines an error in the current flowing in the motor, and generates an error voltage. The error voltage is used by the control driver to drive the motor. The control driver is arranged to drive the motor in PWM and linear modes. The analog core is used in both modes. Because the same analog core is used in both modes, switching times between modes are improved. Furthermore, output current error between modes is reduced. The control driver is also arranged to drive the motor in forwards and reverse directions in both PWM and linear modes.

Figure 1:
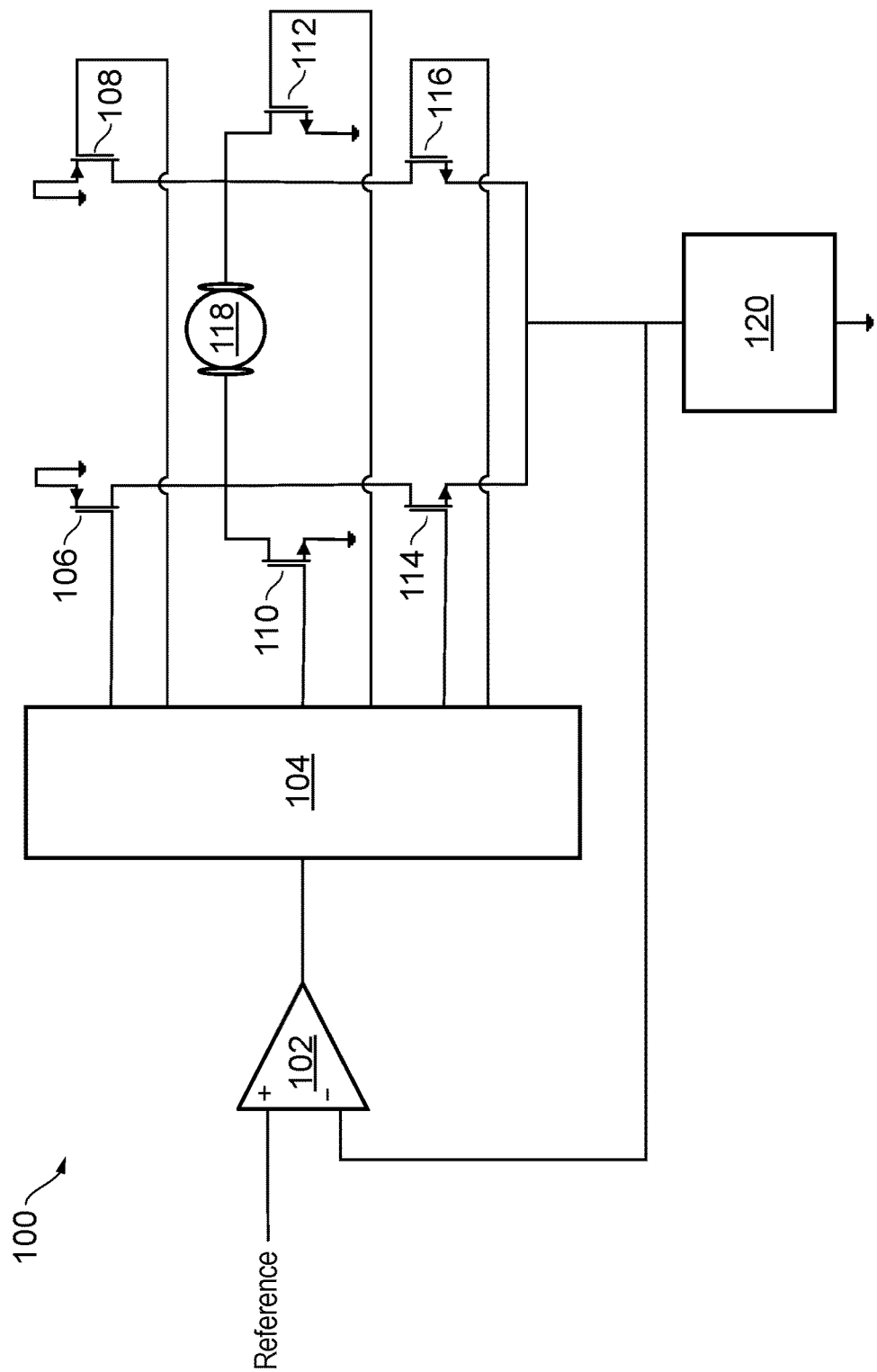
FIG. 1 shows a feedback control system in accordance with an embodiment of the disclosure.

FIG. 1 depicts an embodiment of a feedback control system 100 providing a bi-directional driver having a PWM mode and a linear mode. The feedback control system can include:

an operational amplifier 102;
a PWM/linear control driver 104;
a set of MOSFET switches (106, 108, 110, 112, 114, and 116);
a motor 118; and
sensing circuitry 120.

Typically the set of MOSFET switches includes three groups of switches.

A first group of MOSFET switches (e.g., 106 and 108) accepts a voltage from the PWM/linear control driver 104 and regulates the output current. At any given time, only one of the switches from the first group of MOSFET switches is ON and regulating the output current while the other switches in the first group are OFF, or disabled. As shown in FIG. 1, the switches in the first group of MOSFET switches are configured to be p-type MOSFETs. The first group of switches operates during both the PWM mode and the linear mode.

A second group of MOSFET switches (e.g., 110 and 112) are switches for recirculation of the current. At most, only one of the switches from the second group of MOSFET switches is ON and recirculating the current. A switch from the second group of MOSFETs is activated, or turned ON, only in the PWM mode. During the linear mode, all of the switches in the second group are OFF. As shown in FIG. 1, the switches in the second group of MOSFET switches are configured to be n-type MOSFETs.

A third group of MOSFET switches (e.g., 114 and 116) are switches that steer the current in one direction or another direction. This group of switches controls the motor being actuated in a forward direction or a reverse direction. At any given time, only one of the switches from the third group of MOSFET switches is ON and steering the current. The third group of switches operates during both the PWM mode and the linear mode. As shown in FIG. 1, the switches in the third group of MOSFET switches are configured to be n-type MOSFETs.

During a linear mode, the voltage output from the PWM/linear control driver 104 is applied directly to one switch from the first group of MOSFET switches. The MOSFET switch that is ON operates as a current source and begins regulating the current supplied to the motor 118. In an operation during linear mode, the current flows: from the selected MOSFET from the first group of MOSFET switches, which acts as current source (either 106 or 108); through the motor 118; and through the selected MOSFET from the third group of MOSFET switches, which determines the direction of the motor (either 114 or 116).

During a PWM mode, the voltage output from the PWM/linear control driver 104 is applied to one switch from the first group of MOSFET switches that works in combination with one of the switches from the second group of MOSFET switches. The combination of switches from the first group and the second group (e.g., 106 and 110 or 108 and 112) operate as an inverter. Accordingly, the current applied to the motor 118 during the PWM mode is pulsed as either fully ON or fully OFF. In an operation during PWM mode, the current flows in pulses regulated by the combination of the switches from the first group of MOSFET switches and the second group of MOSFET switches: from the selected MOSFET from the first group of MOSFET switches (either 106 or 108); through the motor 118; and through the selected MOSFET from the third group of MOSFET switches, which determines the direction of the motor (either 114 or 116).

Sensing circuitry 120 provides a circuit component that translates the current available at the junction above 120, which represents the amount of current flowing through the motor 118, into a feedback voltage.

The feedback voltage is then provided as an input to the negative terminal of the operational amplifier 102 for feedback purposes. The operational amplifier 102 compares the feedback voltage at the negative terminal to a reference voltage at the positive terminal and generates a voltage representative of the difference, or error, between the reference voltage and the feedback voltage. The error is then used by PWM/linear control driver 104 to drive the motor accordingly.

In some example embodiments, the first group of MOSFET switches is configured to include n-type MOSFETs and the third group of MOSFET switches is configured to include p-type MOSFET switches. In such an arrangement, the sensing circuitry is instead provided at the top of the circuit and has a junction proximate to the first group of MOSFET switches.

Figure 2:
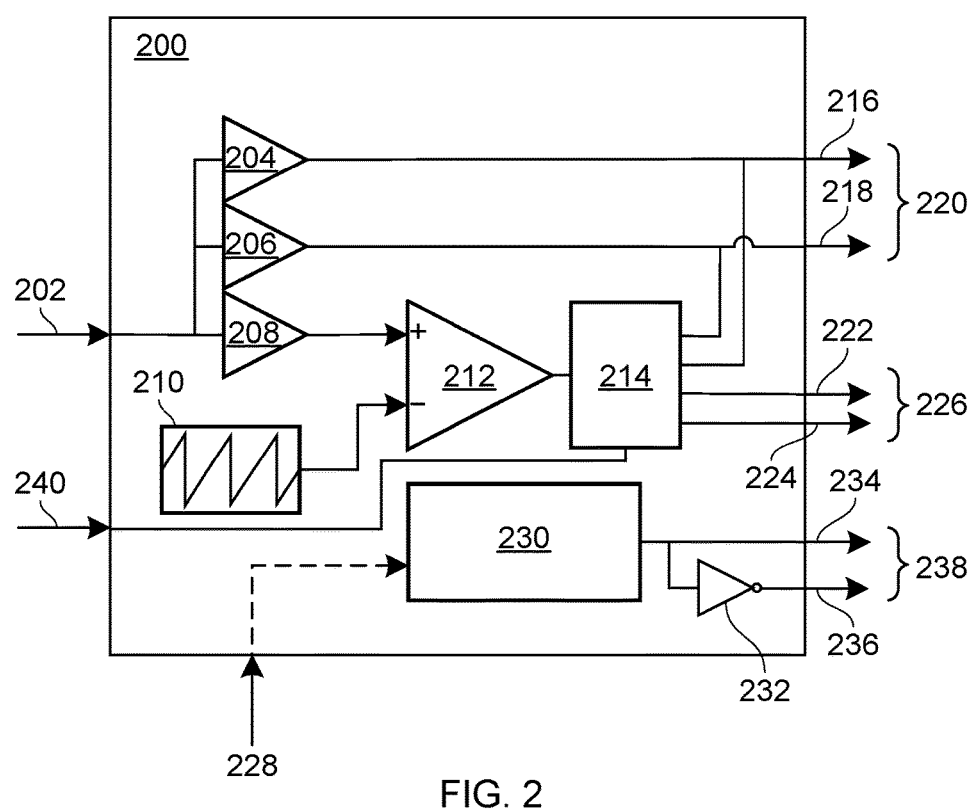
FIG. 2 shows control driver in accordance with an embodiment of the disclosure.

FIG. 2 depicts an embodiment of a bi-directional PWM/linear control driver 200 having a PWM mode and a linear mode. The PWM/linear control driver can include:

buffers 204, 206, and 208;
a ramp signal 210;
an operational amplifier 212;
a PWM digital controller 214;
a direction logic 230; and
a not gate (or inverter) 232.

On the input side, the PWM/linear control driver 200 accepts at least three signals including: an analog signal 202; a motor directionality signal 228; and a control mode signal 240. The analog signal is the error signal generated by the operational amplifier 102 in the feedback control system 100. The motor directionality signal 228 can be either an analog signal or a digital signal and is used to select whether the motor operates in the forward direction or the reverse direction. The control mode signal 240 can be either an analog signal or a digital signal and is used to select whether the motor operates in the PWM mode or the linear mode.

On the output side, the PWM/linear control driver 200 generates at least three sets of signals. The first set of PWM/linear control driver output signals, 220, corresponds to those signals used to control the first group of MOSFET switches. The first set of output signals 220 includes signal 216 and signal 218, which each control a different switch (e.g., 216 controls switch 106 and 218 controls switch 108). The second set of PWM/linear control driver output signals, 226, corresponds to those signals used to control the second group of MOSFET switches. The second set of output signals, 226, includes signal 222 and 224, which each control a different switch (e.g., 222 controls switch 110 and 224 controls switch 112). The third set of PWM/linear control driver output signals, 238, corresponds to those signals used to control the third group of MOSFET switches. The third set of output signals 238 includes signal 234 and 236, which each control a different switch (e.g., 238 controls switch 114 and 236 controls switch 116).

Analog signal 202 is applied to the PWM/linear control driver 200 and passes through buffers 204, 206, and 208. Buffers 204, 206, and 208 can be clocked and synchronized with one another. The voltage signal exiting buffer 208 is applied to the negative terminal of operational amplifier 212. A ramp signal, or a saw-tooth signal 210, is applied to the positive terminal of the operational amplifier 212. The output of operational amplifier is dependent upon the level of the voltage supplied at the negative input terminal, and the output is a square wave. The square wave output is supplied to the PWM digital controller 214. PWM digital controller 214 further accepts as an input the control mode signal 240.

If the control mode signal 240 indicates that the control mode is a linear mode (e.g. control mode signal 240 is a 1), then the PWM digital controller 214 deactivates signals 222 and 224. Also in the linear mode, PWM digital controller 214 acts as a control signal and allows for the output from one of buffers 204 and 206 to directly and continuously flow to the appropriate switch from the first group of MOSFET switches.

If the control mode signal 240 indicates that the control mode is a PWM mode (e.g. control mode signal 204 is a 0), then the PWM digital controller 214 activates outputs 222 and 224. The square wave generated from the output of the operational amplifier 212 is provided to one of 216 and 218 such that the pulsing square wave signal flows to the appropriate switch from the first group of MOSFET switches. Simultaneously, the PWM digital controller 214 provides an inverted version of the square wave generated from the output of the operational amplifier 212 to an appropriate one of outputs 222 and 224.

The signal selected from outputs 222 and 224, and thereby the switch from the second group of MOSFET switches 110, 112, is selected to correspond to the signal from the first group of MOSFET switches receiving the square wave. For example, if the square wave is provided along output 216, which corresponds to switch 106, then the inverted square wave is provided along output 222, which corresponds to switch 110. If the square wave is provided along output 218, which corresponds to switch 108, then the inverted square wave is provided along output 224, which corresponds to switch 112.

The motor directionality signal 228 is at least provided to the direction logic 230. In some embodiments, the motor directionality signal 228 is advantageously further connected to the PWM digital controller 214. According to a selection of a forward operation of the motor or a reverse operation of the motor, the direction logic 230 provides an output signal. The output signal from 230 is, along one channel, inverted by a not gate so that the outputs 234 and 236 are always inverse values.

In some embodiments, the motor directionality signal is provided based on a sensed current value of the feedback control system. The sensed current is the same current sensed by 120. When the current value is greater than zero (Iout>0), direction logic 230 provides an output signal that will operate the motor in a forward direction. When the current value is less than zero (Iout<0), direction logic 230 provides an output signal that will operate the motor in a reverse direction.

FIG. 3A depicts an embodiment of a feedback control system 300 including a bi-directional driver that is operating in a forward direction while in a linear mode. In a feedback control system 300 for a VCM with a bi-directional driver that is operating in a forward direction while in a linear mode, the feedback control system includes:

an operational amplifier 302;
a PWM/linear control driver 304;
a set of MOSFET switches (306, 308, 310, 312, 114, and 316);
a motor 318; and
sensing circuitry 320.

During the linear mode, the voltage output from the PWM/linear control driver 304 is applied directly to one switch, switch 306, from the first group of MOSFET switches. MOSFET switch 306 operates as a current source and begins regulating the current supplied to the motor 318. The current flows from MOSFET 306, which acts as the current source and through the motor 318. PWM/linear control driver 304 further activates MOSFET 316 so that the motor rotates in the forward direction. The current exiting the motor 318 flows through switch 316.

Sensing circuitry 320 provides a circuit component that translates the current available at the junction above 320, which represent the amount of current flow through the motor 318, into a feedback voltage.

The feedback voltage is then provided as an input to the negative terminal of the operational amplifier 302. The operational amplifier 302 compares the feedback voltage at the negative terminal to a reference voltage at the positive terminal and generates a voltage representative of the difference, or error, between the reference voltage and the feedback voltage. The error is then used by PWM/linear control driver 304 to drive the motor accordingly.

FIG. 3B depicts a configuration of a bi-directional PWM/linear driver control 304 that is operating in a forward direction while in a linear mode.

For the feedback control system 300, FIG. 3B depicts the signals provided as outputs from the PWM/linear control driver 304. As the driver is in a linear mode, the error signal from operational amplifier 302 is buffered and provided directly and continuously through the PWM/linear control, over output 322, to switch 306. To activate only one switch from the first group of MOSFETs, output 324 is OFF.

Provided that the feedback control system is in linear mode, both of the outputs associated with the second group of MOSFETs are OFF (e.g., 326 and 328). To drive the motor in the forward direction, output 332 is ON, while output 330 is OFF. Output 332 drives the switch 316 from the third group of MOSFETs.

FIG. 3C depicts an embodiment of a feedback control system 300 including a bi-directional driver that is operating in a reverse direction while in a linear mode.

In a feedback control system 300 for a VCM with a bi-directional driver that is operating in a reverse direction while in a linear mode, the feedback control system includes:
an operational amplifier 334;
a PWM/linear control driver 336;
a set of MOSFET switches (338, 340, 342, 344, 346, and 348);
a motor 350; and
sensing circuitry 352.

During the linear mode, the voltage output from the PWM/linear control driver 336 is applied directly to one switch, switch 340, from the first group of MOSFET switches. MOSFET switch 340 operates as a current source and begins regulating the current supplied to the motor 350. The current flows from MOSFET 340, which acts as the current source and through the motor 350. PWM/linear control driver 336 further activates MOSFET 346 so that the motor rotates in the reverse direction. The current exiting the motor 350 flows through switch 346.

Sensing circuitry 352 provides a circuit component that translates the current available at the junction above 352, which represent the amount of current flow through the motor 350, into a feedback voltage.

The feedback voltage is then provided as an input to the negative terminal of the operational amplifier 334. The operational amplifier 334 compares the feedback voltage at the negative terminal to a reference voltage at the positive terminal and generates a voltage representative of the difference, or error, between the reference voltage and the feedback voltage. The error is then used by PWM/linear control driver 336 to drive the motor accordingly.

FIG. 3D depicts a configuration of a bi-directional PWM/linear control driver 336 that is operating in a reverse direction while in a linear mode.

For the feedback control system 300, FIG. 3D depicts the signals provided as outputs from the PWM/linear control driver 336. As the driver is in a linear mode, the error signal from operational amplifier 334 is buffered and provided directly and continuously through the PWM/linear control driver, over output 356, to switch 340. To activate only one switch from the first group of MOSFETs, output 354 is OFF. Provided that the feedback control system is in linear mode, both of the outputs associated with the second group of MOSFETs are OFF (e.g., 358 and 360). To drive the motor in the reverse direction, output 362 is ON, while output 364 is OFF. Output 362 drives the switch 346 from the third group of MOSFETs.

Although the numbering associated with FIGS. 3A, 3B, 3C, and 3D differs, it should be noted that this is for clarification and reference purposes only. FIGS. 3A and 3C show the same feedback control system and circuit components. FIGS. 3B and 3D show the same PWM/linear control driver that is in each circumstance configured in a different manner based on input signals provided to the PWM/linear control driver.

FIG. 4A depicts an embodiment of a feedback control system 400 including a bi-directional driver that is operating in a forward direction while in a PWM mode.

In a feedback control system 400 for a VCM with a bi-directional driver that is operating in a forward direction while in a PWM mode, the feedback control system includes:
an operational amplifier 402;
a PWM/linear control driver 404;
a set of MOSFET switches (406, 408, 410, 412, 414, and 416);
a motor 418; and
sensing circuitry 420.

During the PWM mode, the voltage output from the PWM/linear control driver 404 is applied directly to one switch, switch 406, from the first group of MOSFET switches. The PWM/linear control driver 404 further activates one switch, switch 410, from the second group of MOSFET switches such that together switches 406 and 410 act as an inverter. Switches 406 and 410 drive the current to flow through the motor 418. PWM/linear control driver 404 further activates MOSFET 416 so that the motor rotates in the forward direction. The current exiting the motor 418 flows through switch 416.

Sensing circuitry 420 provides a circuit component that translates the current available at the junction above 420, which represent the amount of current flow through the motor 418, into a feedback voltage.

The feedback voltage is then provided as an input to the negative terminal of the operational amplifier 402. The operational amplifier 402 compares the feedback voltage at the negative terminal to a reference voltage at the positive terminal and generates a voltage representative of the difference, or error, between the reference voltage and the feedback voltage. The error is then used by PWM/linear control driver 404 to drive the motor accordingly.

FIG. 4B depicts a configuration of a bi-directional PWM/linear control driver 404 that is operating in a forward direction while in a PWM mode.

For the feedback control system 400, FIG. 4B depicts the signals provided as outputs from the PWM/linear control driver 404. As the driver is in a PWM mode, the error signal from operational amplifier 402 is buffered and applied to the negative terminal of another operational amplifier (e.g., operational amplifier 212 in FIG. 2). A ramp signal is applied to the positive terminal of the operational amplifier. The output of operational amplifier, which is a square wave, is supplied to a PWM digital controller. The PWM digital controller applies the output, via 422, to switch 406. To activate only one switch from the first group of MOSFETs, output 424 is OFF. Provided that the feedback control system is in PWM mode, the inverse of the square wave is driven onto output 426 to drive switch 410 from the second group of MOSFETs.

To drive the motor in the forward direction, output 432 is ON, while output 430 is OFF. Output 432 drives the switch 416 from the third group of MOSFETs.

FIG. 4C depicts an embodiment of a feedback control system 400 including a bi-directional driver that is operating in a reverse direction while in a PWM mode.

In a feedback control system 400 for a VCM with a bi-directional driver that is operating in a reverse direction while in a PWM mode, the feedback control system includes:
an operational amplifier 434;
a PWM/linear control driver 436;

a set of MOSFET switches (438, 440, 442, 444, 446, and 448);

a motor 450; and sensing circuitry 452.

During the PWM mode, the voltage output from the PWM/linear control driver 436 is applied directly to one switch, switch 440, from the first group of MOSFET switches. The PWM/linear control driver 436 further activates one switch, switch 444, from the second group of MOSFET switches such that together switches 440 and 444 act as an inverter. Switches 440 and 444 drive the current to flow through the motor 450. PWM/linear control driver 436 further activates MOSFET 446 so that the motor rotates in the reverse direction. The current exiting the motor 450 flows through switch 446.

Sensing circuitry 452 provides a circuit component that translates the current available at the junction above 452, which represent the amount of current flow through the motor 450, into a feedback voltage.

The feedback voltage is then provided as an input to the negative terminal of the operational amplifier 434. The operational amplifier 434 compares the feedback voltage at the negative terminal to a reference voltage at the positive terminal and generates a voltage representative of the difference, or error, between the reference voltage and the feedback voltage. The error is then used by PWM/linear control driver 436 to drive the motor accordingly.

FIG. 4D depicts a configuration of a bi-directional PWM/linear control driver 436 that is operating in a reverse direction while in a PWM mode.

For the feedback control system 400, FIG. 4D depicts the signals provided as outputs from the PWM/linear control driver 434. As the driver is in a PWM mode, the error signal from operational amplifier 434 is buffered and applied to the negative terminal of another operational amplifier (e.g., operational amplifier 212 in FIG. 2). A ramp signal is applied to the positive terminal of the operational amplifier. The output of operational amplifier, which is a square wave, is supplied to a PWM digital controller. The PWM digital controller applies the output, via 456, to switch 440. To activate only one switch from the first group of MOSFETs, output 454 is OFF. Provided that the feedback control system is in PWM mode, the inverse of the square wave is driven onto output 460 to drive switch 444 from the second group of MOSFETs.

To drive the motor in the reverse direction, output 462 is ON, while output 464 is OFF. Output 562 drives the switch 446 from the third group of MOSFETs.

Although the numbering associated with FIGS. 4A, 4B, 4C, and 4D differs, it should be noted that this is for clarification and reference purposes only. FIGS. 4A and 4C show the same feedback control system and circuit components. FIGS. 4B and 4D show the same PWM/linear control driver that is in each circumstance configured in a different manner based on input signals provided to the PWM/linear control.

Similarly, although the numbering associated with FIGS. 3A, 3B, 3B, and 3D differs from the numbering associated with FIGS. 4A, 4B, 4C, and 4D, it should again be noted that this is for clarification and reference purposes only. FIGS. 3A, 3C, 4A, and 4C show the same feedback control system and circuit components. FIGS. 3B, 3D, 4B, and 4D show the same PWM/linear control driver that is in each circumstance configured in a different manner. FIG. 3 overall shows the feedback control system and PWM/linear control configurations for a bidirectional driver while it is operating in a linear mode. FIG. 4 overall shows the same feedback control system and PWM/linear control configurations for the same bidirectional driver while it is operating in a PWM mode.

Figure 5:
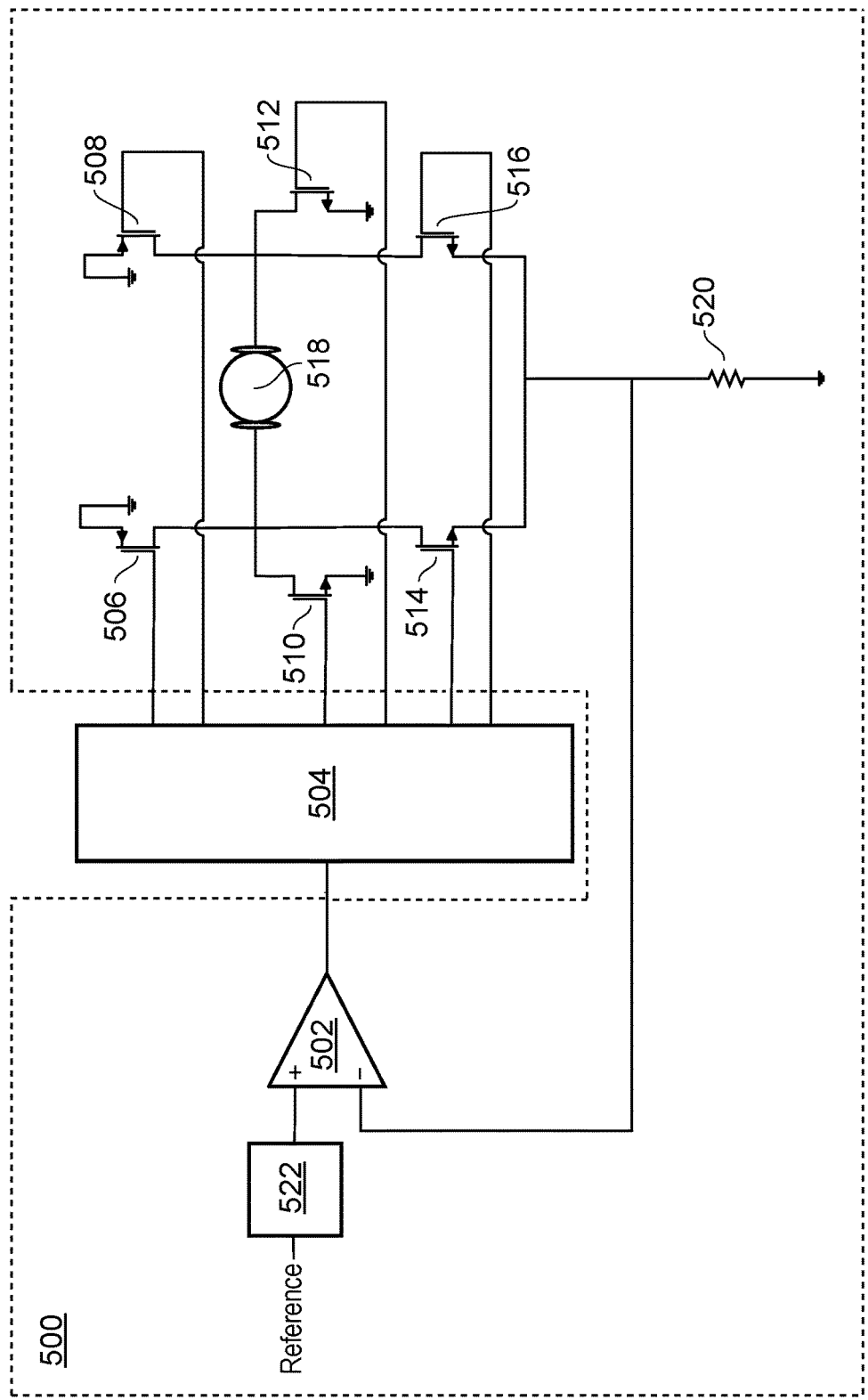
FIG. 5 shows a feedback control system in accordance with an embodiment of the disclosure.

FIG. 5 depicts a feedback control system having an analog core 500 and a bi-directional control driver 504 having a PWM mode and a linear mode.

Analog core 500 includes analog circuit components in place of the sensing circuitry described in foregoing FIGS. 1 to 4. Analog core 500 capitalizes on the reuse of the sensing circuitry to reduce DC error between the linear mode and the PWM mode. Analog core 500 can include:

an operational amplifier 502;

a resistive digital-to-analog converter (r-DAC) 522;

a set of MOSFET switches (506, 508, 510, 512, 514, and 516); and sensing circuitry.

Sensing circuitry is, in analog core 500, a sensing resistor 520 and an r-DAC (or digital potentiometer) 522. In some embodiments, the r-DAC includes a resistor ladder integrated circuit. In other embodiments, the r-DAC includes a digital-to-analog converter. r-DAC 522 accepts, as an input, a digital code.

The digital code provides a number of bits as an instruction to the r-DAC 522. The number of bits characterizes, as the instruction, the degree to which resistance should be varied in the r-DAC. For example, an 8-bit digital code can control up to 256 (28) different levels of resistance to be supplied by the r-DAC. Protocols for signaling the varying level of resistance of the r-DAC can include I2C, SMBus, Serial Peripheral Interface Bus, which further facilitate configuration of the resistive elements in the r-DAC.

In the analog core 500, the MOSFET switches 506, 508, 510, 512, 514, and 516 are organized into an H-bridge. The sensing circuitry, the sensing resistor 520, senses the current flowing through the motor and the H-bridge. When the current is driven to the sensing resistor 520, a feedback voltage is generated. The feedback voltage is applied to the negative terminal of the operational amplifier 502.

The operational amplifier 502 compares the feedback voltage to a reference voltage, which is applied to the positive terminal of the operational amplifier. A digital code representative of the reference voltage is applied to a resistive digital-to-analog converter (r-DAC), and the output of the r-DAC is applied as the reference voltage to the positive terminal of the operational amplifier 502.

The operational amplifier 502 generates an analog voltage that is proportional to the error between the reference voltage and the feedback voltage. As time passes, over a number of clock cycles, the operational amplifier and the PWM/linear control driver 504 will influence the current provided to the motor so that the current provided (Iout) is properly regulated.

The analog core 500, described in the foregoing, can be implemented in a system that operates a VCM in both a forward direction and a reverse direction. Further, the analog core 500 can be implemented in a system that drives the VCM in both a linear mode and a PWM mode.

Analog core 500 has several advantages. First, analog core 500 can be reused when the VCM operates in each of: a forward direction in a linear mode; a reverse direction in a linear mode; a forward direction in a PWM mode; and a reverse direction in a PWM mode. By maintaining the same core analog architecture in each of these operations, analog core 500 minimizes the output current error variation between the modes. By reusing the same components, analog core 500 further minimizes the switching times between the modes.

Analog core 500 is further advantageous in that there are no glitches in the linear mode when the code changes. The code input to the r-DAC in analog core 500 occurs at the positive input terminal to the operational amplifier. By doing so, the code changes do not affect the transitions between the modes. When the r-DAC is instead located within the current varying section of the feedback circuit, as provided with analog core 600 and analog core 700, a change in the r-DAC code can produce a voltage glitch that affects the input at the negative terminal of the operational amplifier. The operational amplifier's transfer response, based on this voltage glitch, could result in an unintended change in the current output used to drive the motor.

Figure 6:
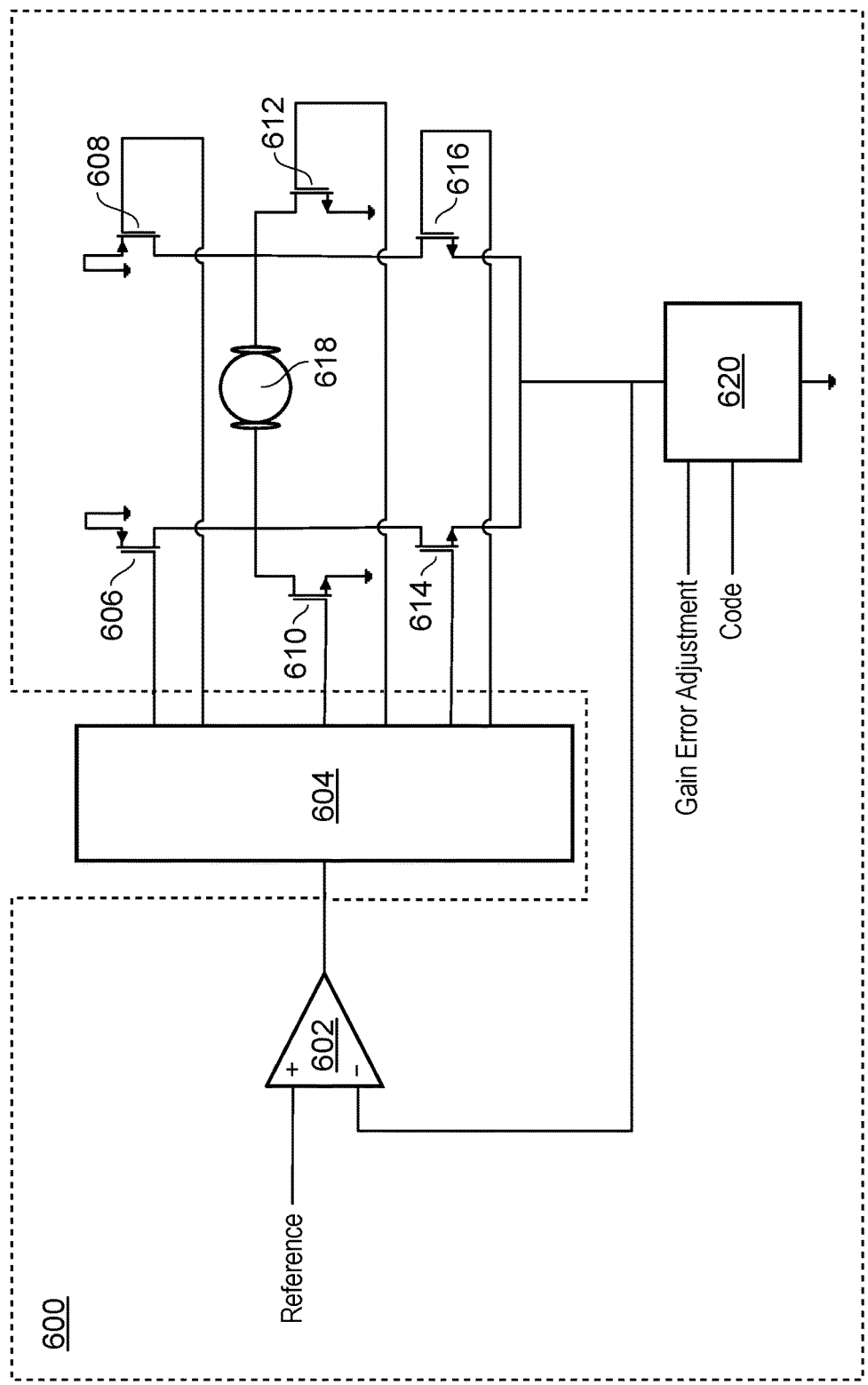
FIG. 6 shows a feedback control system in accordance with an embodiment of the disclosure.

FIG. 6 depicts a feedback control system having an analog core 600 and a bi-directional driver 604 having a PWM mode and a linear mode.

Analog core 600 includes analog circuit components in place of the sensing circuitry described in foregoing FIGS. 1 to 4. Analog core 600 capitalizes on the reuse of the sensing circuitry to reduce DC error between the linear mode and the PWM mode. Analog core 600 can include:
 an operational amplifier 602;
 a set of MOSFET switches (606, 608, 610, 612, 614, and 616); and
 sensing circuitry.

Sensing circuitry is, in analog core 600, an r-DAC (or digital potentiometer) 620. In some embodiments, the r-DAC includes a resistor ladder integrated circuit. In other embodiments, the r-DAC includes a digital to analog converter. r-DAC 620 accepts, as an input, a digital code.

The digital code provides a number of bits as an instruction to the r-DAC. The number of bits characterizes, within the instruction, the degree to which resistance should be varied in the r-DAC. For example, an 8-bit digital code can control up to 256 (28) different levels of resistance to be supplied by the r-DAC. Protocols for signaling the varying level of resistance of the r-DAC can include I2C, SMBus, Serial Peripheral Interface Bus, which further facilitate configuration of the resistive elements in the r-DAC.

A voltage, or a set of voltages, sensed at the r-DAC of the analog core 600 can further be used to pinpoint the errors in the gain of the transfer function of the feedback control loop. To correct these gain errors, a signal from the r-DAC 620 can be sent for external processing. The gain error can be categorized by the external processor, and the reference voltage provided to the input terminal of the operational amplifier 602 can be manipulated accordingly to correct for the gain error.

Analog core 600 has several advantages. First, analog core 600 can be reused when the VCM operates in each of: a forward direction in a linear mode; a reverse direction in a linear mode; a forward direction in a PWM mode; and a reverse direction in a PWM mode. By maintaining the same core analog architecture in each of these operations, analog core 600 minimizes the output current error between the modes. By reusing the same components, analog core 600 further minimizes the switching times between the modes.

Analog core 600 is further advantageous in that any amplifier offset, inherent to the operational amplifier, does not affect the linear response of the feedback circuit. For example, analog core 500 translates amplifier offset into an offset error in the regulated output current. Analog core 600 does not include offset error because the code input to the r-DAC and the modification of the current occurs in the feedback loop, and not at the reference terminals of the operational amplifier. Accordingly, amplifier offset does not affect the transfer function representative of the functionality of the feedback circuit. By instead placing the r-DAC in feedback loop, any offset error is instead translated into gain error. Gain error can be easily resolved by trimming, or by adjusting the reference voltage at the input terminal of the operational amplifier.

Figure 7:
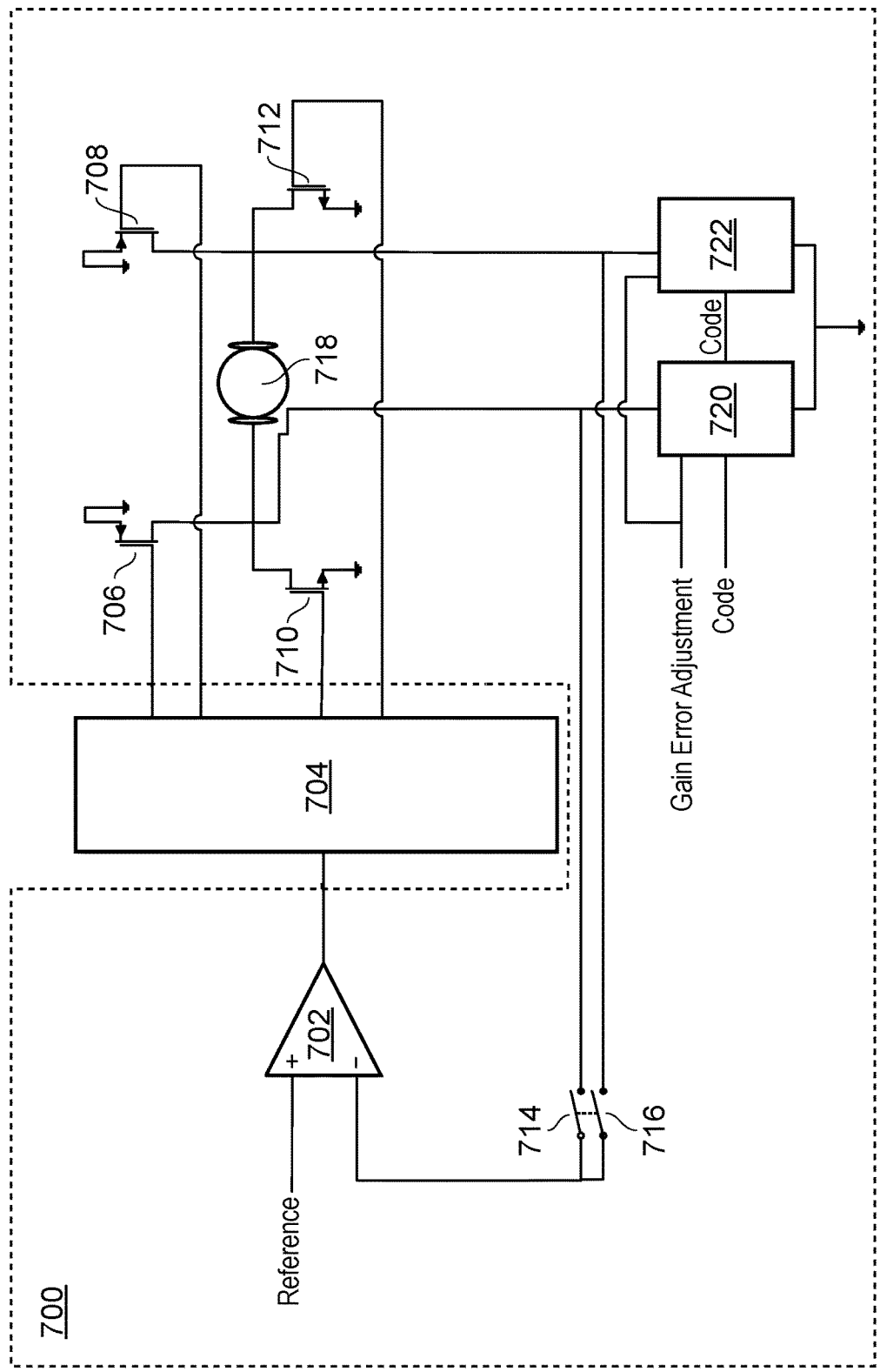
FIG. 7 shows a feedback control system in accordance with an embodiment of the disclosure.

FIG. 7 depicts a feedback control system having an analog core 700 and a bi-directional driver having a PWM mode and a linear mode.

Analog core 700 includes analog circuit components in place of the sensing circuitry described in foregoing FIGS. 1 to 4. Analog core 700 capitalizes on the reuse of the sensing circuitry to reduce DC error between the linear mode and the PWM mode.

Analog core 700 can include:
 an operational amplifier 702;
 a set of MOSFET switches (706, 708, 710, 712, 714, and 716); and
 sensing circuitry.

Sensing circuitry is, in analog core 700, two r-DACs 720 and 722, and switches 714 and 716. In some embodiments, at least one of the r-DACs includes a resistor ladder integrated circuit. In other embodiments, at least one of the r-DACs includes a digital to analog converter. r-DACs 720 and 722 each accept, as an input, a digital code. In some embodiments, the digital code provided to each of r-DAC 720 and r-DAC 722 is the same digital code.

As described in the foregoing, the digital code provides a number of bits as an instruction to the r-DAC. The number of bits characterizes, as the instruction, the degree to which resistance should be varied in the r-DAC. For example, an 8-bit digital code can control up to 256 (28) different levels of resistance to be supplied by the r-DAC. Protocols for signaling the varying level of resistance of the r-DAC, can include I2C, SMBus, Serial Peripheral Interface Bus, which further facilitate configuration of the resistive elements in the r-DAC.

r-DACs 720 and 722 are each connected to a different one of the current paths between the switches. When the feedback system is in linear driving mode, r-DAC 720 is connected to the path in which switch 708 acts as a current source and r-DAC 722 is connected to the path in which switch 706 acts as a current source. When the feedback system is in PWM driving mode, r-DAC 720 is connected to the path in which current is pulsed through switch 708, and in which switches 708 and 712 act as an inverter. When the feedback system is in PWM driving mode, r-DAC 722 is connected to the path in which current is pulsed through switch 706, and in which switches 706 and 710 act as an inverter.

When r-DAC 720 is active, switch 714 connects the feedback voltage to the negative terminal of operational amplifier 702 and switch 716 is open. When r-DAC 722 is active, switch 716 connects the feedback voltage to the negative terminal of operational amplifier 702 and switch 714 is open. Switches 714 and 716 can be configured in various ways known to those of ordinary skill in the art. Together, switches 714 and 716 can in some embodiments be a single pole double throw switch or a single pole changeover switch. Separately, switches 714 and 716 can in some embodiments each be configured as a single pole single throw switch.

A voltage, or a set of voltages, sensed at the respective r-DAC of the analog core 700 can further be used to pinpoint the errors in the gain of the transfer function of the feedback control loop. To correct these gain errors, a signal from one of the r-DAC 720 and the r-DAC 722 can be sent for external processing. The gain error can be categorized by the external processor, and the reference voltage provided to the input terminal of the operational amplifier 702 can be manipulated accordingly to correct for the gain error.

Analog core 700 has several advantages. First, analog core 700 can be reused when the VCM operates in each of: a forward direction in a linear mode; a reverse direction in a linear mode; a forward direction in a PWM mode; and a reverse direction in a PWM mode. By maintaining the same core analog architecture in each of these operations, analog core 700 minimizes the output current error between the modes. By reusing the same components, analog core 700 further minimizes the switching times between the modes.

Analog core 700 is further advantageous in that any amplifier offset, inherent to the operational amplifier, does not affect the linear response of the feedback circuit. For example, analog core 500 translates amplifier offset into an offset error in the regulated output current. Analog core 700 does not include offset error because the code input to the r-DACs and the modification of the current occurs in the feedback loop, and not at the reference terminals of the operational amplifier. Accordingly, amplifier offset does not affect the transfer function representative of the functionality of the feedback circuit. By instead placing the r-DAC in feedback loop, any offset is translated into gain error. Gain error can be easily resolved by trimming, or by adjusting the reference voltage at the input terminal of the operational amplifier.

In PWM mode, analog core 700 provides more accurate current sensing. This is because all of the current flowing through the motor is sensed by the appropriate r-DAC. Analog core 700 cures sensitivity issues inherent to the analog core 600. In analog core 600, a fraction of the current flowing through the motor circulates through a forward biased diode of an OFF device of the H-bridge in PWM mode. In both analog core 600 and analog core 700, the assumption is that, at the active r-DAC, all of the current flowing through the motor is sensed and converted into a voltage signal. In analog core 600, this assumption is not as accurate during PWM mode. In PWM mode, parasitic diodes consume a portion of the current that flows through the motor. Current consumption by parasitic diodes is inherent to power switches, such as MOSFETs, which can collect and consume current. Accordingly, by implementing a set of low voltage switches in analog core 700, the current sensed and used for feedback control is more accurate.

Of the three analog cores disclosed, analog core 700 further provides the lowest number of stacked devices. By reducing the number of stacked devices, the consumption of power and voltage inherent to each of the devices is minimized.

FIG. 8A depicts an embodiment of a feedback control system 800 including a bi-directional driver that is operating in a PWM mode. In a feedback control system 800 for a VCM with a bi-directional driver that is operating in a PWM mode, the feedback control system includes:

an operational amplifier 802;
a PWM/linear control driver 804;
a set of MOSFET switches (806, 808, 810, and 812);
a motor 818;
r-DAC 820 and r-DAC 822; and
voltage switches 814 & 816.

During the PWM mode, the voltage output from the PWM/linear control driver 804 is applied directly to one switch from the first group of MOSFET switches, which is one of switch 806 and 808. The PWM/linear control driver 804 further activates one switch, which is one of switch 810 and switch 812, from the second group of MOSFET switches such that an inverter is generated. The current is driven by the combination of the switches through the motor 818. PWM/linear control driver 804 further provides a switch control signal 832 to the voltage switches 814 and 816.

One of r-DAC 820 and r-DAC 822 is used as a circuit component that translates the amount of current flow through the motor 418 into a feedback voltage.

The feedback voltage is then provided as an input to the negative terminal of the operational amplifier 802 via a voltage switch 814 or 816. The operational amplifier 802 compares the feedback voltage at the negative terminal to a reference voltage at the positive terminal and generates a voltage representative of the difference, or error, between the reference voltage and the feedback voltage. The error is then used by PWM/linear control driver 804 to drive the motor accordingly.

FIG. 8B depicts an illustration of the configuration of a bi-directional driver control 804 that is operating in a PWM mode.

For the feedback control system 800, FIG. 8B depicts the signals provided as outputs from the PWM/linear control 804. As the driver is in a PWM mode, the error signal from operational amplifier 802 is buffered and applied to the negative terminal of another operational amplifier (e.g., operational amplifier 212 in FIG. 2). A ramp signal is applied to the positive terminal of the operational amplifier. The output of operational amplifier, which is a square wave, is supplied to a PWM digital control. The PWM digital control applies the output, via one of 824 and 826, to one of switches 806 and 808. To activate only one switch from the first group of MOSFETs, the other output is turned OFF (e.g., a selection of 824 for the pulsed signal results in 826 having a 0 or OFF signal). Provided that the feedback control system is in PWM mode, the inverse of the square wave is driven onto one of output 828 and 830 to drive a respective switch 810 and 812 from the second group of MOSFETs. Only one switch, 810 or 812, should be activated at any time.

To drive the direction of the motor 818, switch control 832 recognizes, based on the selected MOSFET switch from the first group of MOSFETs, whether the motor is being operated in a forward direction or a reverse direction. Accordingly, switch control 832 provides a signal that closes one of 814 and 816 and opens the other one of 814 and 815.

For example, when PWM digital control selects output 824 to drive 806 from the first group of MOSFETs and 828 to drive 810 from the second group of MOSFETs, the switch control 832 closes switch 816, which is associated with r-DAC 822. This results in the motor being driven in the forward direction. The motor is driven in the reverse direction when PWM digital control selects output 826 to drive 808 from the first group of MOSFETs and 830 to drive 812 from the second group of MOSFETs. The switch control 832 closes switch 814, which is associated with r-DAC 820.

FIG. 8C depicts an embodiment of a feedback control system 800 including a bi-directional driver that is operating in a linear mode. In a feedback control system 800 for a VCM with a bi-directional driver that is operating in a linear mode, the feedback control system includes:

an operational amplifier 834;
a PWM/linear control driver 836;
a set of MOSFET switches (838, 840, 842, and 844);
a motor 850;
r-DAC 852 and r-DAC 854; and
voltage switches 846 & 848.

During the linear mode, the voltage output from the PWM/linear control driver 836 is applied directly to one switch from the first group of MOSFET switches, which is one of switch 838 and 840. The PWM/linear control driver 836 in linear mode does not activate either switch 842 or switch 844 from the second group of MOSFET switches. The current is driven by the selected switch from the first group of MOSFET switches through the motor 850. PWM/linear control driver 836 further provides a switch control signal 864 to the voltage switches 846 and 848.

One of r-DAC 8252 and r-DAC 854 is used as a circuit component that translates the amount of current flow through the motor 450 into a feedback voltage.

The feedback voltage is then provided as an input to the negative terminal of the operational amplifier 834 via a voltage switch 846 or 848. The operational amplifier 834 compares the feedback voltage at the negative terminal to a reference voltage at the positive terminal and generates a voltage representative of the difference, or error, between the reference voltage and the feedback voltage. The error is then used by PWM/linear control 836 to drive the motor accordingly.

FIG. 8D depicts an illustration of the configuration of a bi-directional PWM/linear control driver 836 that is operating in a linear mode.

For the feedback control system 800, FIG. 8D depicts the signals provided as outputs from the PWM/linear control driver 836. As the driver is in a linear mode, the error signal from operational amplifier 834 is buffered and provided directly and continuously through the PWM/linear control driver, over one of output 856 and 858, to one of switches 838 and 840 from the first group of MOSFETs. To activate only one switch from the first group of MOSFETs, the other output is turned OFF (e.g., a selection of 856 for the pulsed signal results in 858 having a 0 or OFF signal). Provided that the feedback control system is in linear mode, both of the outputs associated with the second group of MOSFETs are OFF (e.g., 860 and 862).

To drive the direction of the motor 850, switch control 864 recognizes, based on the selected MOSFET switch from the first group of MOSFETs, whether the motor is being operated in a forward direction or a reverse direction. Accordingly, switch control 832 provides a signal that closes one of 846 and 848 and opens the other one of 846 and 848.

For example, when the linear buffered signals are provided to output 856 to drive 838 from the first group of MOSFETs and 860 to drive 842 from the second group of MOSFETs, the switch control 832 closes switch 848, which is associated with r-DAC 854. This results in the motor being driven in the forward direction. The motor is driven in the reverse direction when output 858 drives 840 from the first group of MOSFETs and 862 to drive 844 from the second group of MOSFETs. The switch control 832 closes switch 846, which is associated with r-DAC 852.

In the embodiments described above in connection with FIGS. 5 to 7, the analog core is described as including the switches that are used to control the motor. In a further embodiment, the analog core may include the sensing circuitry and the operational amplifiers 502, 602, 702, but not the switches. The feedback control system may include two sets of switches; a first set for use with the PWM modes and a second set for use with the linear mode. In this case, the benefits improved switching times and reduced output error are still realised as a result of the feedback path being shared between modes.

Figure 9:
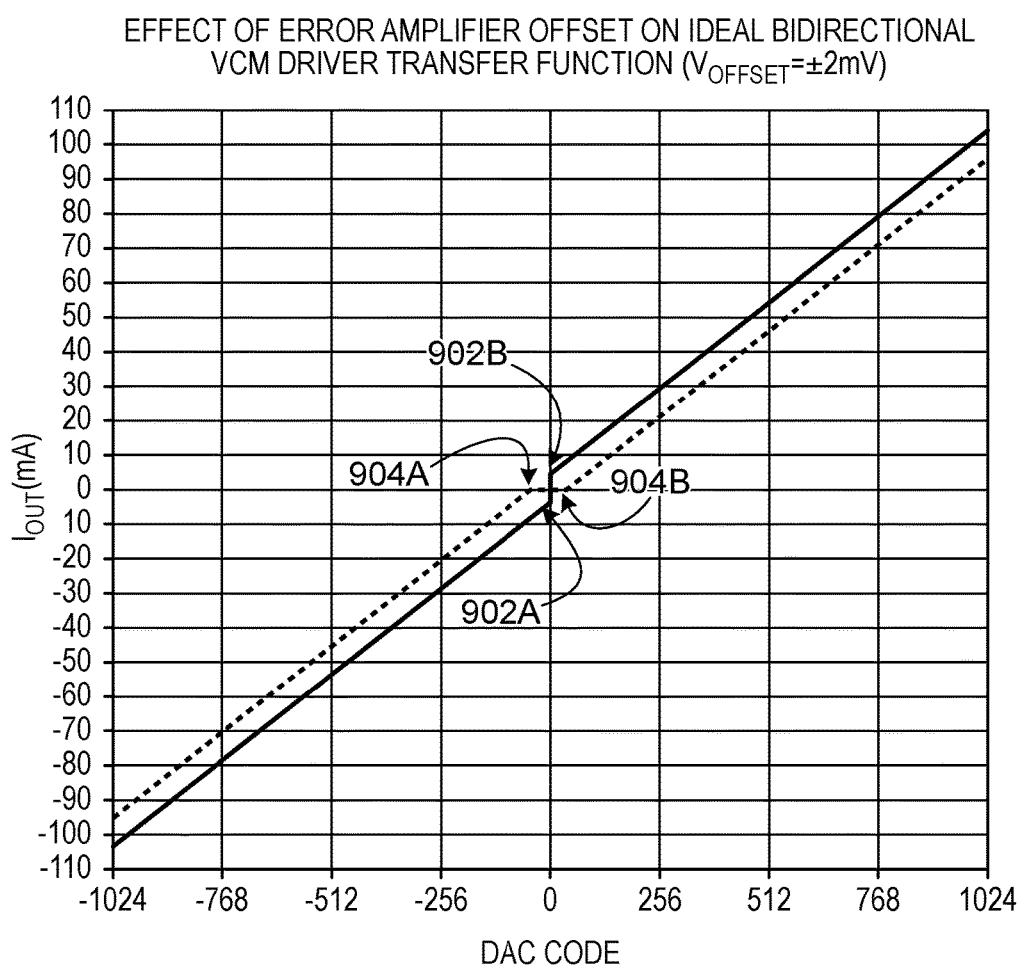
FIG. 9 is a chart showing the effect of offset error on a VCM transfer function.

FIG. 9 depicts an illustration of the effect of an offset error associated with the analog core 500 on the VCM PWM/linear driver transfer function. The DAC code, which is implemented to control the voltage provided at the input reference terminal of the operational amplifier, is provided as a variable along the x-axis of FIG. 9. The current output, which is driven onto the motor, is provided as a variable along the y-axis of FIG. 9. Negative DAC code values correlate with negative current values driven onto the motor. Positive DAC code values correlate with positive current values driven onto the motor. As described in the foregoing, when the current output (Iout) is negative, the motor is driven in the reverse direction. When Iout is positive, the motor is driven in the forward direction. Therefore, when Iout is at zero, the motor is in transition from one of a reverse direction to a forward direction or a forward direction to a reverse direction.

902 (including 902A and 902B) and 904 (including 904A and 904B) are each associated with one of the polarities of the offset generated by the operational amplifier. In the example shown, the operational amplifier offset translates into an offset voltage of +/−2 mV.

In a first case, 902 indicates how the offset voltage error results in a linear inconsistency with the Iout centered immediately around the zero current transition. For example, a DAC code of −2 (in the 902A region) is associated with a negative Iout value that is substantially lower than the positive Iout value that is associated with a DAC code of 2 (in the 902B region). The sudden jump in Iout values centered around the zero region afflicts the transfer function. In the case demonstrated by 902, the motor cannot be regulated precisely at very low current values because regulation can only be achieved at higher and lower current levels. With respect to 902, the accuracy of the current measurements proximate to the zero current region is low.

In a second case, 904 indicates, for the opposite polarity of offset voltage relative to 902, how the offset voltage error results in linear inconsistency with the DAC codes centered immediately around the zero current transition. For example, a DAC code of −2 (in the 904A region) is associated with a 0 mA current value. Similarly, a DAC code of +2 (in the 904B region) is associated with a 0 mA current value. The plateau region, in which a substantial number of DAC codes are each associated with a 0 mA current value, afflicts the transfer function. In the case demonstrated by 904, the sensitivity of the current measurements proximate to the current region is non-existent. No current is supplied to the motor for a range of DAC codes centered around the zero current region.

Figure 10:
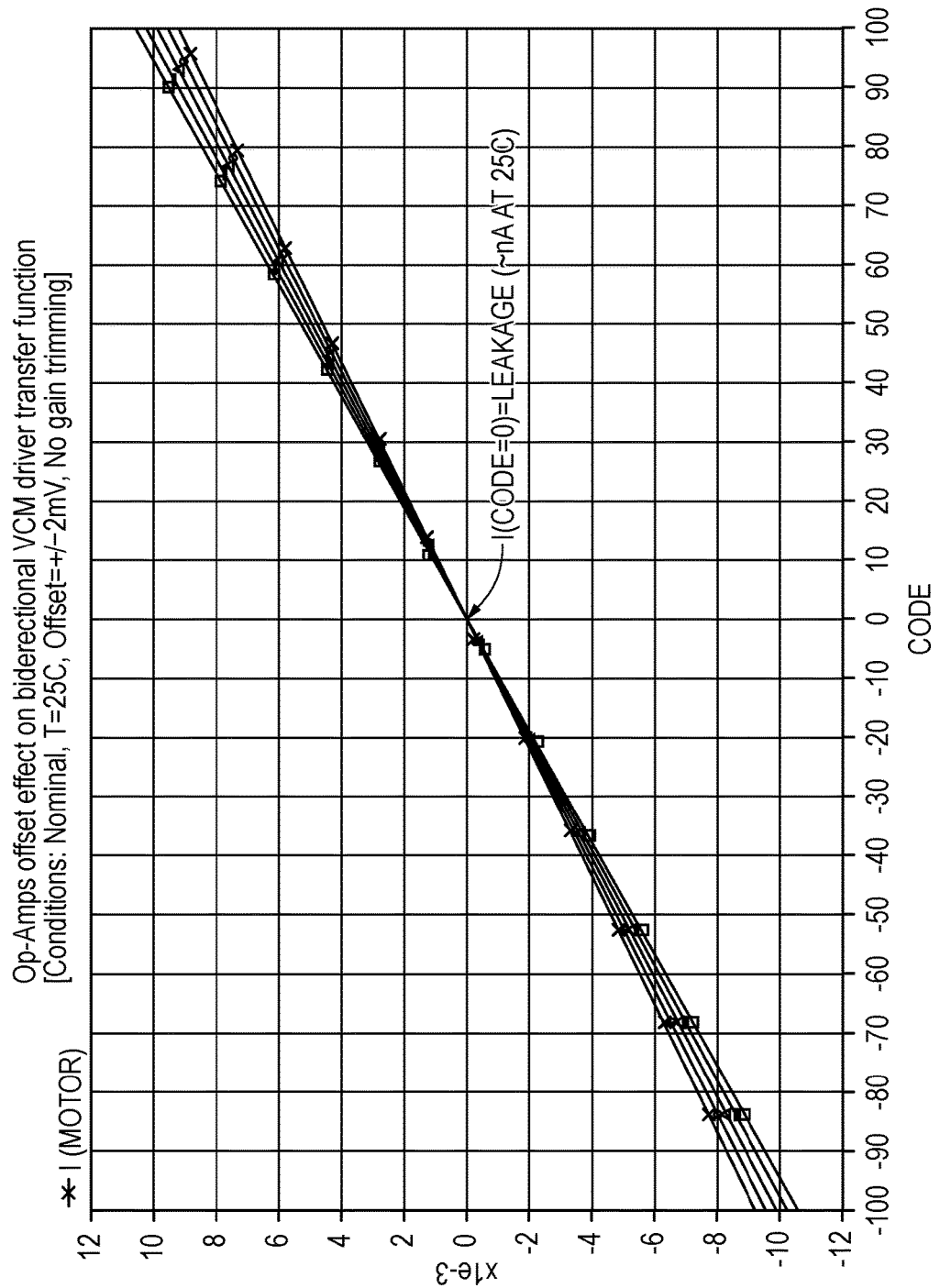
FIG. 10 is a chart showing the effect of gain error on a VCM transfer function.

FIG. 10 depicts an illustration of the effect of a gain error associated with the analog core 600 and analog core 700 on the VCM PWM/linear driver transfer function. For each of the analog core 600 and the analog core 700, the DAC code, which is implemented to control the current flow returning to the operational amplifier from the power region of the circuit, is provided as a variable along the x-axis of FIG. 10. The current output, which is driven onto the motor, is provided as a variable along the y-axis of FIG. 10 (in mA). Negative DAC code values correlate with negative current values driven onto the motor. Positive DAC code values correlate with the positive current values driven onto the motor. As described in the foregoing, when the current output (Iout) is negative, the motor is driven in the reverse direction. When Iout is positive, the motor is driven in the forward direction. Therefore, when Iout is at zero, the motor is in transition from one of a reverse direction to a forward direction or a forward direction to a reverse direction.

The plurality of lines having different variations in Iout are provided for different test cases and indicate that a given code can have a range in Iout extending from a minimum Iout to a maximum Iout. The unpredictability associated with the slopes is attributed to the gain error. However, the transfer function for a feedback circuit having such a gain error does not introduce the issues described in the foregoing with reference to FIG. 9. FIG. 10 depicts a full range of currents, without gaps, that can be used to drive the VCM. Similarly, each code provided to the r-DACs results in a different current output. Accordingly, the relocation of the r-DAC to the placement associated with analog cores 600 and 700 increases accuracy and sensitivity.

Any issues associated with the gain error can be corrected by adjusting the reference voltage at the input terminal to the operational amplifier in the feedback loop accordingly.

In other embodiments, the analog core can include other similar circuit elements to facilitate reuse of the analog core in VCM systems that operate in: a forward linear mode, a reverse linear mode, a forward PWM mode, and a reverse PWM mode.

Additionally, any feature of the feedback control system, analog core, and methods of using the feedback control system described herein can optionally be used in any other embodiment of the feedback control system and methods of using the feedback control system. Also, embodiments of the system and methods of using the feedback control system can optionally include any subset or ordering of the features of the feedback control system and methods of using the feedback control system described herein.

What is claimed is:

1. A feedback control system, comprising:
an analog core;
a control driver; and
an electromagnetic load of a voice coil motor (VCM); wherein
the analog core is arranged to provide feedback from the electromagnetic load to the control driver in order to regulate a current consumption of the VCM;
the control driver is arranged to receive, from the analog core, an error voltage corresponding to an error in a current applied to the electromagnetic load, the control driver drives a current to the electromagnetic load which is bidirectional on average, excluding transients; and,
the control driver is further arranged to receive a motor directionality signal and a control mode signal; and,
the control driver is further arranged to control the current applied to the electromagnetic load based on the error voltage;
wherein, the analog core comprises a plurality of switches arranged as an H-bridge having two legs to drive the electromagnetic load such that the current ingressing through one leg of the H-bridge egresses the other leg;
further wherein, the control driver is arranged to operate in a linear mode and a pulse width modulation mode.

2. The system of claim 1, wherein the analog core is further arranged to drive the electromagnetic load.

3. The system of claim 2, wherein the control driver is further arranged to control the current applied to the electromagnetic load using the analog core.

4. The system of claim 3, wherein the control driver is further arranged to control the current applied to the electromagnetic load using a control voltage.

5. The system of claim 1, wherein the control driver is arranged to operate the VCM in a forward direction and in a reverse direction.

6. The system of claim 1, wherein the analog core includes sensing circuitry arranged to generate a feedback voltage based on a current flowing through the electromagnetic load.

7. The system of claim 6, wherein the analog core further comprises a comparator, arranged to compare the feedback voltage to a reference voltage and to generate the error voltage.

8. The system of claim 6, wherein the sensing circuitry includes a current sensing resistor coupled to the electromagnetic load.

9. The system of claim 6, wherein the sensing circuitry includes at least one resistive digital-to-analog converter coupled to the electromagnetic load.

10. The system of claim 1, wherein the plurality of switches is a plurality of MOSFETs.

11. The system of claim 1, wherein the system is operated in a closed loop.

12. A controller for a voice coil motor (VCM) in which the controller is arranged to operate the voice coil motor bidirectionally in linear and pulse width modulation modes; wherein, the controller inputs comprise an analog signal, a motor directionality signal, and a control mode signal.

13. A method of controlling a current applied to an electromagnetic load of a voice coil motor (VCM), comprising:
driving an electromagnetic load of a voice coil motor (VCM);
receiving, at a control driver, a motor directionality signal and a control mode signal;
receiving from an analog core, at the control driver, an error voltage corresponding to an error in the current applied to the electromagnetic load;
controlling, using the control driver, the current applied to the electromagnetic load based on the error voltage, the control driver drives a current to the electromagnetic load which is bidirectional on average, excluding transients;
driving the electromagnetic load with a plurality of switches arranged as an H-bridge having two legs to drive the electromagnetic load such that current ingressing through one leg of the H-bridge egressing the other leg; and
operating the control driver in either a pulse width modulation mode or linear mode.

14. The method of claim 13, further comprising generating, using a sensing circuit, a feedback voltage based on a current flowing through the electromagnetic load, wherein the sensing circuit is part of the analog core.

15. The method of claim 14, further comprising: comparing, using a comparator, the feedback voltage to a reference voltage and to generate the error voltage, wherein the comparator is part of the analog core.

16. The method of claim 14, wherein the sensing circuit includes a current sensing resistor, coupled to the electromagnetic load, and wherein the step of generating a feedback voltage is performed using current sensing.

17. The method of claim 14, wherein the sensing circuit includes at least one resistive digital-to-analog converter, coupled to the electromagnetic load, and wherein the step of generating a feedback voltage is performed using current sensing.

* * * * *